US009829168B2

(12) United States Patent
Yen

(10) Patent No.: US 9,829,168 B2
(45) Date of Patent: Nov. 28, 2017

(54) CAR LED LIGHT CAPABLE OF CHANGING COLOR TEMPERATURE

(71) Applicant: Chung-Chun Yen, Taichung (TW)

(72) Inventor: Chung-Chun Yen, Taichung (TW)

( * ) Notice: Subject to any disclaimer, the term of this patent is extended or adjusted under 35 U.S.C. 154(b) by 51 days.

(21) Appl. No.: 15/046,570

(22) Filed: Feb. 18, 2016

(65) Prior Publication Data

US 2017/0241610 A1 Aug. 24, 2017

(51) Int. Cl.

*B60Q 1/00* (2006.01)
*B60Q 1/26* (2006.01)
*F21S 8/10* (2006.01)
*F21V 14/08* (2006.01)
*F21Y 115/10* (2016.01)

(52) U.S. Cl.

CPC ......... *F21S 48/1721* (2013.01); *F21S 48/115* (2013.01); *F21S 48/1225* (2013.01); *F21S 48/1305* (2013.01); *F21V 14/08* (2013.01); *F21Y 2115/10* (2016.08)

(58) Field of Classification Search

CPC ...... B60Q 1/00; B60Q 1/26; F21S 8/10; F21S 4/00; F21V 1/00; F21V 21/00
USPC .................... 362/487, 545, 509, 217.01, 235
See application file for complete search history.

(56) References Cited

U.S. PATENT DOCUMENTS

| | | | | |
|---|---|---|---|---|
| 8,777,454 | B2 | 7/2014 | Yen | |
| 2009/0086500 | A1* | 4/2009 | Tatara .................... | B60Q 1/076 362/512 |
| 2012/0206050 | A1* | 8/2012 | Spero ....................... | B60Q 1/04 315/152 |
| 2014/0140053 | A1* | 5/2014 | Liu ......................... | F21V 29/22 362/231 |
| 2014/0301084 | A1 | 10/2014 | Yen | |

* cited by examiner

*Primary Examiner* — Edwyn Labaze
(74) *Attorney, Agent, or Firm* — Ming Chow; Sinorica, LLC

(57) ABSTRACT

A car LED light capable of changing color temperature includes a lamp holder. A front side of the lamp holder is provided with a concave trough and formed with an opening. The lamp holder is provided with an LED module in the concave trough. The LED module has a beam angle θ. A color temperature change unit is provided in front of the LED module and includes a drive member. The drive member is connected with a light filter and drives the light filter to move relative to the LED module. Through the drive member, the light filter is selectively to be in front of the beam angle θ for changing the color temperature of the light emitted from the LED module; or the light filter is selectively to be away from the range of the beam angle θ for keeping the original color temperature of the light.

15 Claims, 6 Drawing Sheets

CAR LED LIGHT CAPABLE OF CHANGING COLOR TEMPERATURE

BACKGROUND OF THE INVENTION

1. Field of the Invention

The present invention relates to a car LED light, and more particularly to a car LED light capable of changing color temperature.

2. Description of the Prior Art

Different color temperatures of the light have different illumination characteristics. For example, white light provides a bright visual effect and is suitable for a general weather. Yellowish light has a better penetration to provide a better illumination effect for a rainy or foggy day. The inventor has invented car lights which are able to change color temperature in accordance with different environments, as disclosed in U.S. Pat. No. 8,777,454 and early publication No. US20140301084. The car light comprises a lamp holder. The front of the lamp holder is provided with a reflection trough and formed with an opening. The lamp holder comprises a light source in the reflection trough. The lamp holder is further provided with a color temperature change unit. The color temperature change unit has a light filter. The light emitted from the light source can be selectively filtered fully or not for changing the color temperature of the car light.

The car light disclosed in the aforesaid patents uses a light bulb as the light source. The light from the light source radiates 360 degrees. For the light to be filtered fully or not in order to meet the strict standards of SAE and DOT certification, namely, no color mixing or overflowing light, the color temperature change unit must be disposed at the opening. On condition that the light filter is controlled to block the opening fully, the direct light emitted from the light source can be fully blocked and is reflected by the reflection trough to achieve the object that the light is fully filtered. Alternatively, the light filter is controlled to be away from the opening, enabling the light to pass through the opening directly so as to achieve the object that the light is not filtered.

With the development of technology, the existing car lights are provided with LEDs as a light source. By using the LEDs, the size of the car light is reduced greatly. The aforesaid patents of the inventor also use LEDs as the light source of the car light. However, because the color temperature change unit must be lifted or turned, the entire car light is larger in size, unable to meet the demand of a compact car light. Accordingly, the inventor of the present invention has devoted himself based on his many years of practical experiences to solve these problems.

SUMMARY OF THE INVENTION

The primary object of the present invention is to provide a car LED light capable of changing color temperature.

In order to achieve the aforesaid object, the car LED light capable of changing color temperature of the present invention comprises a lamp holder. A front side of the lamp holder is provided with a concave trough and formed with an opening. The lamp holder is provided with an LED module in the concave trough. The LED module has a beam angle θ. The lamp holder is further provided with a color temperature change unit. The color temperature change unit is and located close to the LED module. The color temperature change unit comprises a drive member. The drive member is connected with at least one light filter and able to drive the light filter to move relative to the LED module. The light filter is located in front of the beam angle θ. The area of the light filter is greater than the beam angle θ.

The car LED light capable of changing color temperature of the present invention uses the LED module which provides direct light and has a limitation of the beam angle θ. The color temperature change unit is directly disposed in front of the LED module and the area of the light filter is greater than the beam angle θ. Through the drive member, the light filter is selectively driven to be in front of the beam angle θ, enabling the light emitted from the LED module to be first filtered by the light filter to radiate toward a front of the lamp holder; or the light filter is selectively driven to be away from the range of the beam angle θ, enabling the light emitted from the LED module to radiate toward the front of the lamp holder directly, not filtered by the light filter. Thereby, the light can be fully filtered or not through the light filter to achieve the object of changing color temperature. Compared to the prior invention of the inventor, the present invention can simplify the structure greatly to reduce the size of the car light and lower the cost.

DETAILED DESCRIPTION OF THE PREFERRED EMBODIMENTS

Embodiments of the present invention will now be described, by way of example only, with reference to the accompanying drawings.

Figure 1:
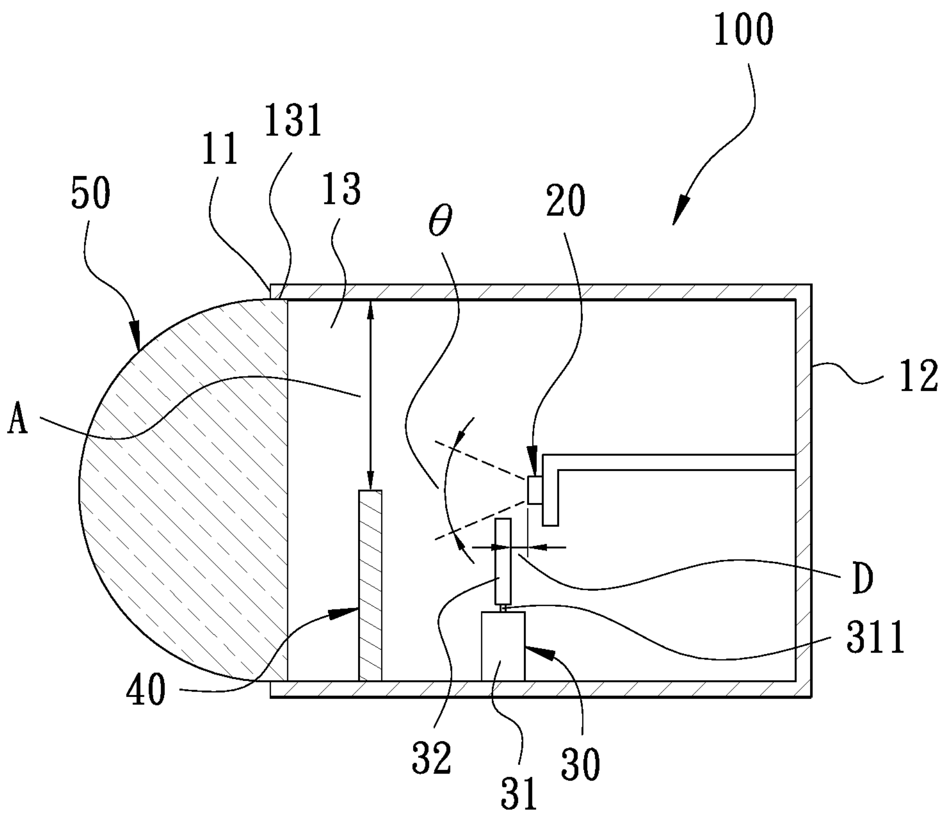
FIG. 1 is a sectional view according to a first embodiment of the present invention.

FIG. 1 is a sectional view according to a first embodiment of the present invention. The present invention discloses a car LED light 100 capable of changing color temperature. The car LED light 100 comprises a lamp holder 10, an LED module 20, a color temperature change unit 30, a light blocking unit 40, and a lens 50.

The lamp holder 10 has a front side 11 and an opposing rear side 12. The front side 11 is provided with a concave trough 13 and formed with an opening 131.

The LED module 20 is disposed in the concave trough 13. Wherein, the LED module 20 is direct light having a beam angle θ, namely, the light emitted from the LED module 20 is within the range of the beam angle θ. There is no light out of the range of the beam angle θ. The beam angle of the LED light on the market is about 80 to 135 degrees.

The color temperature change unit 30 is disposed on the lamp holder 10 and located close to the LED module 20. The color temperature change unit 30 comprises a drive member 31. The drive member 31 is connected with at least one light filter 32 and can drive the light filter 32 to move relative to the LED module 20, such that the light filter 32 is selectively located in front of the beam angle θ or away from the range of the beam angle θ. In this embodiment, the drive member 31 is a solenoid valve having a telescopic rod 311. The telescopic rod 311 is connected with the light filter 32. Wherein, the light filter 32 is located in front of the beam angle θ, and the distance D between the light filter 32 and the LED module 20 is less than 2 cm. The area of the light filter 32 is greater than the beam angle θ.

The light blocking unit 40 is disposed at the opening 131 of the lamp holder 10 and located in front of the color temperature change unit 30. In this embodiment, the light blocking unit 40 can be a light blocking plate 41. The light blocking plate 41 is configured to shelter the lower portion of the opening 131. The upper portion of the opening 131 is not sheltered by the light blocking plate 41 to form a light outlet A.

The lens 50 is disposed in front of the light blocking unit 40 to cover the entire opening 131.

Referring to FIG. 1, in a normal state, when the LED module 20 starts to illuminate, the light blocking plate 41 shelters the lower portion of the opening 131, so that the light emitted from the LED module 20 passes through the light outlet A only. The light is refracted through the lens 50 to radiate toward the front of the lamp holder 10. Wherein, because the light filter 32 is driven by the drive member 31 to be located out of the range of the beam angle θ, the light will not touch the light filter 32 so as to ensure that the color temperature of the light will not be influenced by the light filter 32.

Figure 2:
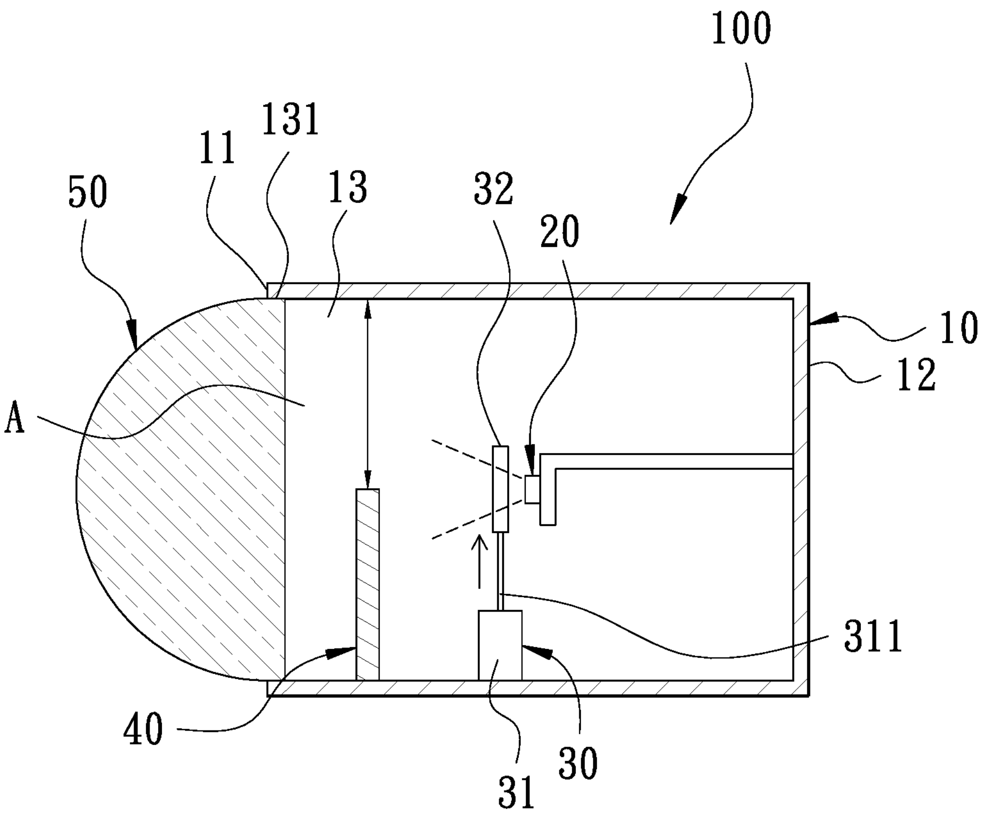
FIG. 2 is a schematic view showing operation of the first embodiment of the present invention.

FIG. 2 is a schematic view showing operation of the first embodiment of the present invention. When the user wants to change the color temperature of the light, the drive member 31 is actuated to drive the light filter 32 to move and block the beam angle θ. The light emitted from the LED module 20 is first filtered by the light filter 32 to change its color temperature and then radiates toward the front of the lamp holder 10. The area of the light filter 32 is greater than the beam angle θ, which ensures that the light emitted from the LED module 20 is fully filtered before radiating.

Accordingly, the present invention uses the LED module 20 which provides direct light and has a limitation of the beam angle θ. The color temperature change unit 30 is directly disposed in front of the LED module 20 and the area of the light filter 32 is greater than the beam angle θ, such that the drive member 31 drives the light filter 32 to be selectively located in front of the beam angle θ or away from the range of the beam angle θ for the light to be fully filtered or not in order to achieve the object of changing color temperature. Compared to the prior invention of the inventor, the present invention can simplify the structure greatly to reduce the size of the car light and lower the cost.

It is noted that the area of the beam angle θ will increase with the distance. Preferably, the distance D between the light filter 31 and the LED module 20 is less than 2 cm, such that the light filter 32 won't be too big. If the light filter 32 is too big, it will cause a burden to the drive member 31 and the lamp holder 10 must be enlarged to provide enough space for movement of the light filter 32.

Figure 3:
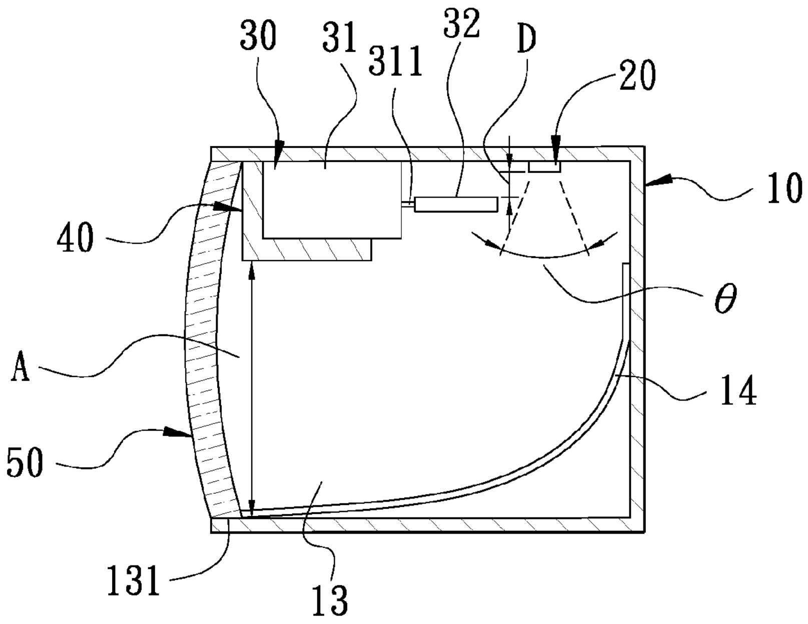
FIG. 3 is a sectional view according to a second embodiment of the present invention.
Figure 4:
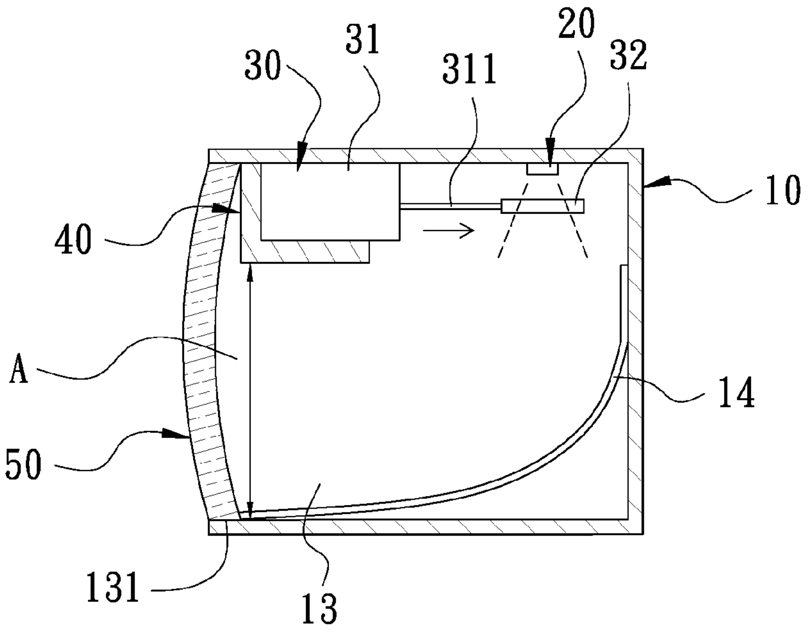
FIG. 4 is a schematic view showing operation of the second embodiment of the present invention.

FIG. 3 is a sectional view according to a second embodiment of the present invention. FIG. 4 is a schematic view showing operation of the second embodiment of the present invention. The car LED light 100 capable of changing color temperature of the second embodiment is substantially similar to the first embodiment with the exceptions described hereinafter. The lamp holder 10 is provided with a reflection board 14 on the inner wall of the concave trough 13. The LED module 20 is disposed on the upper wall of the lamp holder 10. The beam angle θ faces the reflection board 14. The light blocking unit 40 shelters the upper portion of the opening 131, and the lower portion of the opening 131 is not sheltered by the light blocking unit 40 to form a light outlet A. The light emitted from the LED module 20 is reflected by the reflection board 14 to pass through the light outlet A directly. The light can be totally filtered or not through the color temperature change unit 30 to achieve the object of changing color temperature.

Figure 5:
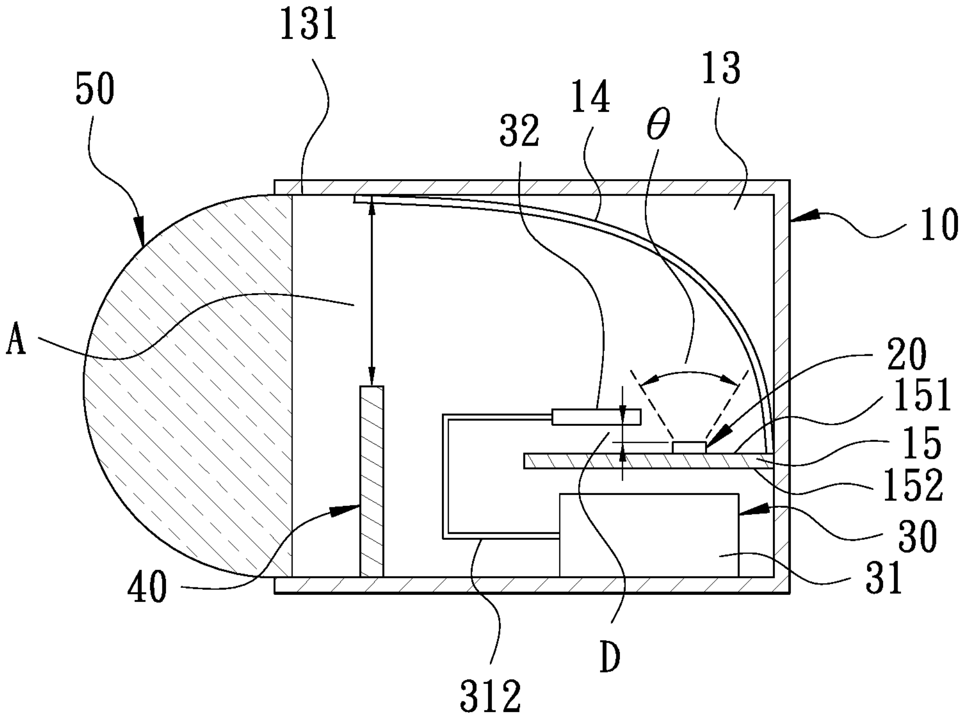
FIG. 5 is a sectional view according to a third embodiment of the present invention.
Figure 6:
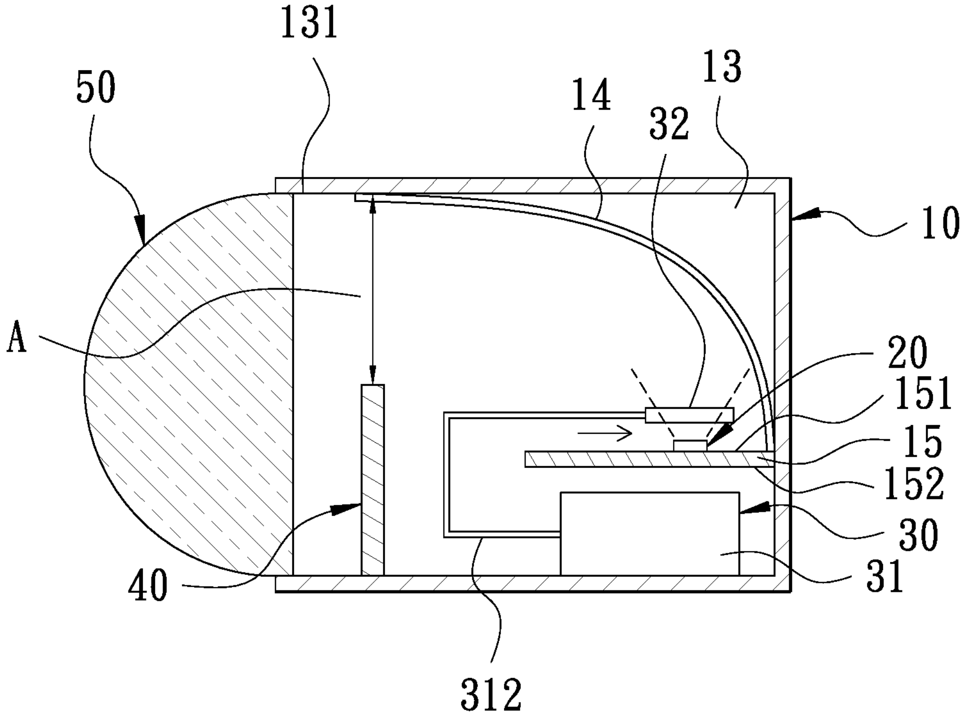
FIG. 6 is a schematic view showing operation of the third embodiment of the present invention.

FIG. 5 is a sectional view according to a third embodiment of the present invention. FIG. 6 is a schematic view showing operation of the third embodiment of the present invention. The car LED light 100 capable of changing color temperature of the third embodiment is substantially similar to the first embodiment with the exceptions described hereinafter. The lamp holder 10 is provided with a reflection board 14 and a retaining board 15 on the inner wall of the concave trough 13. One side of the retaining board 15, facing the reflection board 14, is defined as a first side 151, and another side is defined as a second side 152. The LED module 20 is disposed at the first side 151 of the retaining board 15. The drive member 31 is a solenoid valve disposed at the second side 152 of the retaining board 15. The drive member 31 is connected with one end of a C-shaped connecting rod 312. Another end of the C-shaped connecting rod 312 is bent and extends to the first side 151 of the retaining board 15, and is further connected with the light filter 32. The light filter 32 is located between the reflection board 14 and the LED module 20. Thus, the drive member 31 can drive the C-shaped connecting rod 312 to link the light filter 32 to be selectively located in front of the beam angle θ or away from the range of the beam angle θ so as to achieve the object of changing color temperature. This spatial configuration that the LED module 20 is disposed at the first side 151 and the drive member 31 is disposed at the second side 152 can further reduce the size of the whole car LED light 100.

Figure 7:
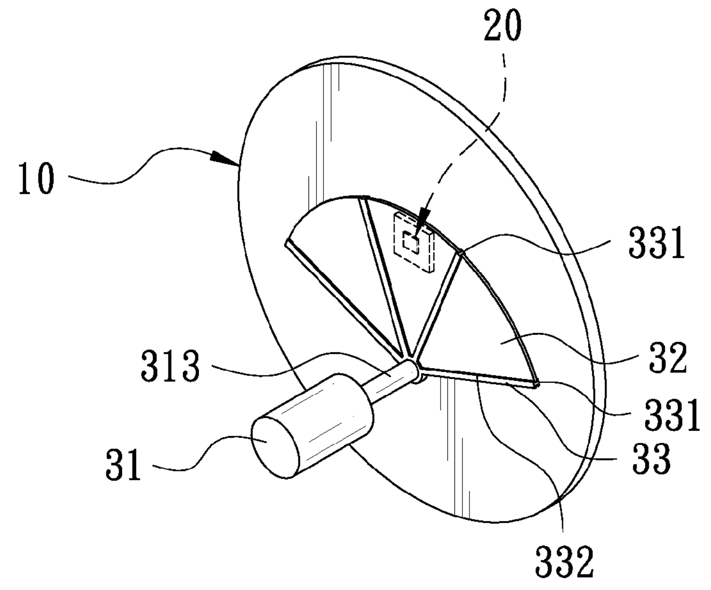
FIG. 7 is a sectional view according to a fourth embodiment of the present invention.
Figure 8:
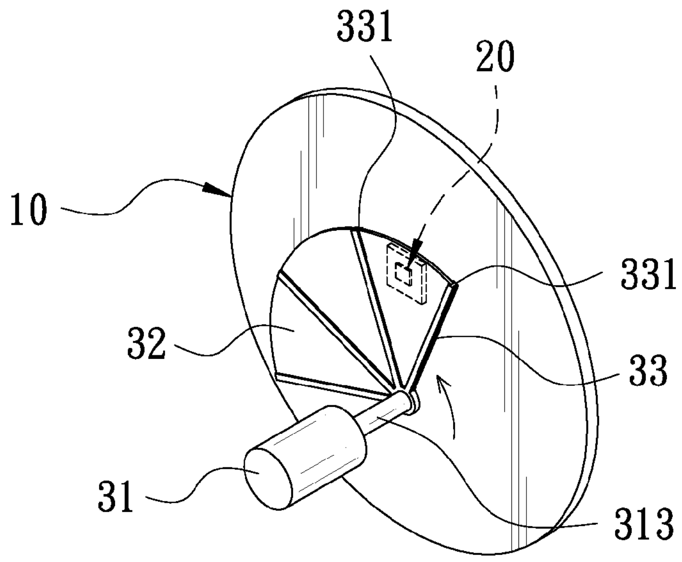
FIG. 8 is a schematic view showing operation of the fourth embodiment of the present invention.

FIG. 7 is a sectional view according to a fourth embodiment of the present invention. FIG. 8 is a schematic view showing operation of the fourth embodiment of the present invention. The car LED light 100 capable of changing color temperature of the fourth embodiment is substantially similar to the first embodiment with the exceptions described hereinafter. The drive member 31 is a motor and has a turning shaft 313. The turning shaft 313 is connected with a turning frame 33. The turning frame 33 is located in front of the beam angle θ of the LED module 20. The turning frame 33 has a plurality of spaced connecting ribs 331 to form an accommodation space 332 between every two of the connecting ribs 331 for securing the light filter 32. In this embodiment, each accommodation space 332 is provided with a light filter 32. The light filters 32 are in different colors, and at least one of the light filters 32 is transparent. Thus, the drive member 31 can drive the turning frame 33 to turn relative to the LED module 20, such that the accommodation spaces 332 pass through the front of the beam angle θ in sequence along with turning of the turning frame 33 for the light to penetrate trough the light filters of different colors to provide a multicolor change.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A car LED light capable of changing color temperature, comprising a lamp holder, a front side of the lamp holder being provided with a concave trough and formed with an opening, the lamp holder being provided with an LED module in the concave trough, characterized by:

the LED module 20 having a beam angle θ;

a color temperature change unit disposed on the lamp holder and located close to the LED module, the color temperature change unit comprising a drive member, the drive member being connected with at least one light filter and able to drive the light filter to move relative to the LED module, the light filter being located in front of the beam angle θ, the light filter having a area greater than the beam angle θ;

thereby, through the drive member, the light filter being selectively driven to be in front of the beam angle θ, enabling the light emitted from the LED module to be first filtered by the light filter to radiate toward a front of the lamp holder, or the light filter being selectively driven to be away from the range of the beam angle θ, enabling the light emitted from the LED module to radiate toward the front of the lamp holder directly, not filtered by the light filter;

the lamp holder being provided with a reflection board on an inner wall of the concave trough, and the beam angle θ of the LED module facing the reflection board; and the lamp holder being provided with a retaining board on the inner wall of the concave trough, one side of the retaining board, facing the reflection board, being defined as a first side and another side being defined as a second side, and the LED module being disposed at the first side of the retaining board.

2. The car LED light capable of changing color temperature as claimed in claim 1, wherein a distance between the light filter and the LED module is less than 2 cm.

3. The car LED light capable of changing color temperature as claimed in claim 1, wherein the drive member is disposed at the second side of the retaining board, the drive member is connected with one end of a C-shaped connecting rod, another end of the C-shaped connecting rod is bent and extends to the first side of the retaining board and is further connected with the light filter, and the light filter is located between the reflection board and the LED module.

4. The car LED light capable of changing color temperature as claimed in claim 1, wherein the drive member is connected with a turning frame, the turning frame is located in front of the beam angle θ of the LED module, the turning frame has a plurality of spaced accommodation spaces for securing the light filter, and the drive member drives the turning frame to turn relative to the LED module, such that the accommodation spaces pass through the front of the beam angle θ in sequence.

5. The car LED light capable of changing color temperature as claimed in claim 4, wherein the accommodation spaces each is provided with the light filter, the light filters of the accommodation spaces are in different colors, and at least one of the light filters is transparent.

6. The car LED light capable of changing color temperature as claimed in claim 1, further comprising a light blocking unit, the light blocking unit being disposed at the opening of the lamp holder and located in front of the color temperature change unit.

7. The car LED light capable of changing color temperature as claimed in claim 6, further comprising a lens, the lens being disposed in front of the light blocking unit to cover the opening.

8. A car LED light capable of changing color temperature, comprising a lamp holder, a front side of the lamp holder being provided with a concave trough and formed with an opening, the lamp holder being provided with an LED module in the concave trough, characterized by:

the LED module 20 having a beam angle θ;

a color temperature change unit disposed on the lamp holder and located close to the LED module, the color temperature change unit comprising a drive member, the drive member being connected with at least one light filter and able to drive the light filter to move relative to the LED module, the light filter being located in front of the beam angle θ, the light filter having a area greater than the beam angle θ;

thereby, through the drive member, the light filter being selectively driven to be in front of the beam angle θ, enabling the light emitted from the LED module to be first filtered by the light filter to radiate toward a front of the lamp holder, or the light filter being selectively driven to be away from the range of the beam angle θ, enabling the light emitted from the LED module to radiate toward the front of the lamp holder directly, not filtered by the light filter;

the drive member being connected with a turning frame, the turning frame being located in front of the beam angle θ of the LED module, the turning frame having a plurality of spaced accommodation spaces for securing the light filter, and the drive member driving the turning frame to turn relative to the LED module, such that the accommodation spaces pass through the front of the beam angle θ in sequence.

9. The car LED light capable of changing color temperature as claimed in claim 8, wherein a distance between the light filter and the LED module is less than 2 cm.

10. The car LED light capable of changing color temperature as claimed in claim 8, wherein the lamp holder is provided with a reflection board on an inner wall of the concave trough, and the beam angle θ of the LED module faces the reflection board.

11. The car LED light capable of changing color temperature as claimed in claim 10, wherein the lamp holder is provided with a retaining board on the inner wall of the concave trough, one side of the retaining board, facing the reflection board, is defined as a first side and another side is defined as a second side, and the LED module is disposed at the first side of the retaining board.

12. The car LED light capable of changing color temperature as claimed in claim 11, wherein the drive member is disposed at the second side of the retaining board, the drive member is connected with one end of a C-shaped connecting rod, another end of the C-shaped connecting rod is bent and extends to the first side of the retaining board and is further connected with the light filter, and the light filter is located between the reflection board and the LED module.

13. The car LED light capable of changing color temperature as claimed in claim 8, wherein the accommodation spaces each is provided with the light filter, the light filters of the accommodation spaces are in different colors, and at least one of the light filters is transparent.

14. The car LED light capable of changing color temperature as claimed in claim 8, further comprising a light blocking unit, the light blocking unit being disposed at the opening of the lamp holder and located in front of the color temperature change unit.

15. The car LED light capable of changing color temperature as claimed in claim 14, further comprising a lens, the lens being disposed in front of the light blocking unit to cover the opening.

* * * * *